July 7, 1931. J. J. KENNEDY ET AL 1,813,496
FIELD CONTROL FOR ELECTRIC MACHINES
Filed Dec. 5, 1928 3 Sheets-Sheet 1
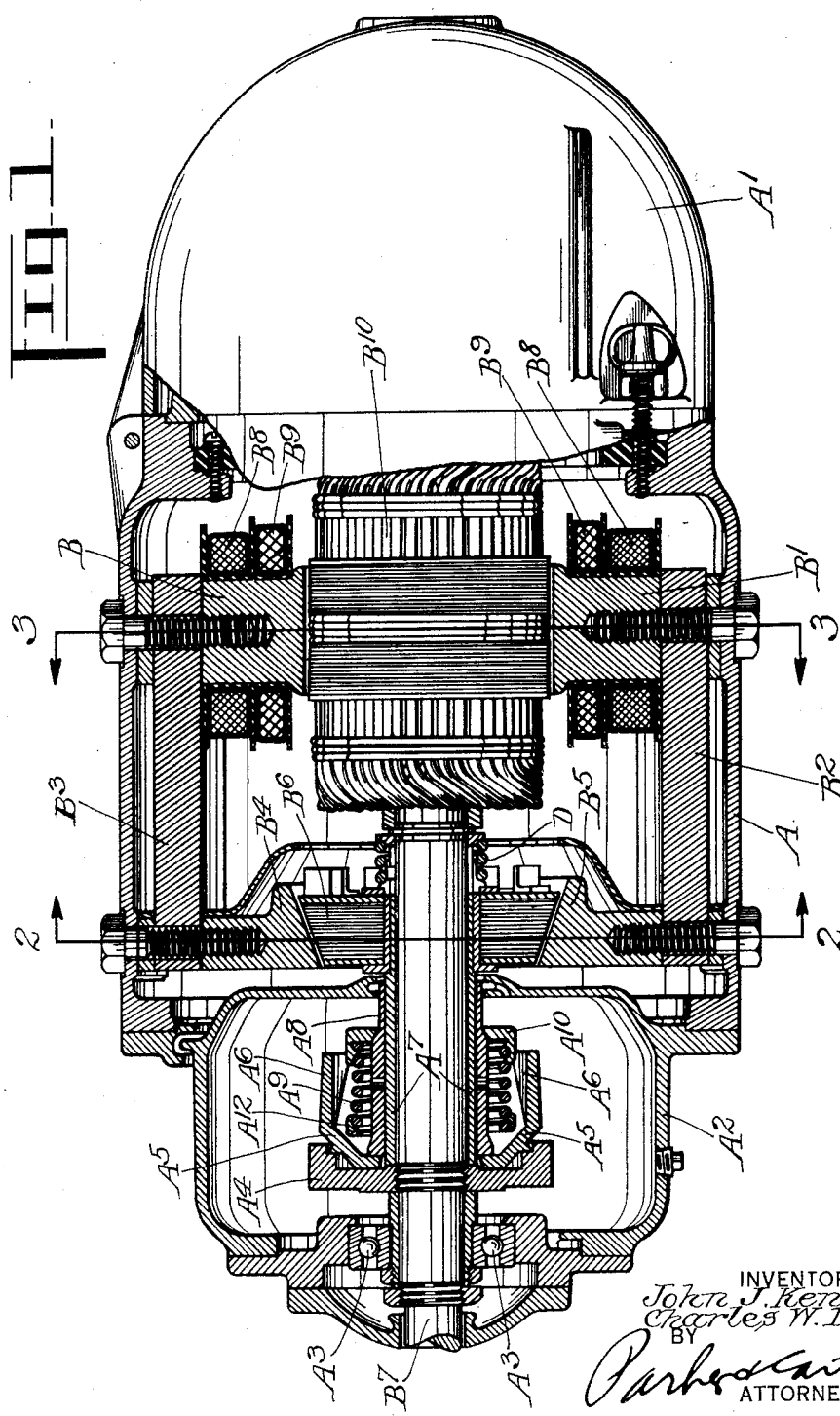
INVENTORS
John J. Kennedy
Charles W. Dake
BY
Parker & Carts
ATTORNEYS.

July 7, 1931. J. J. KENNEDY ET AL 1,813,496
FIELD CONTROL FOR ELECTRIC MACHINES
Filed Dec. 5, 1928 3 Sheets-Sheet 2
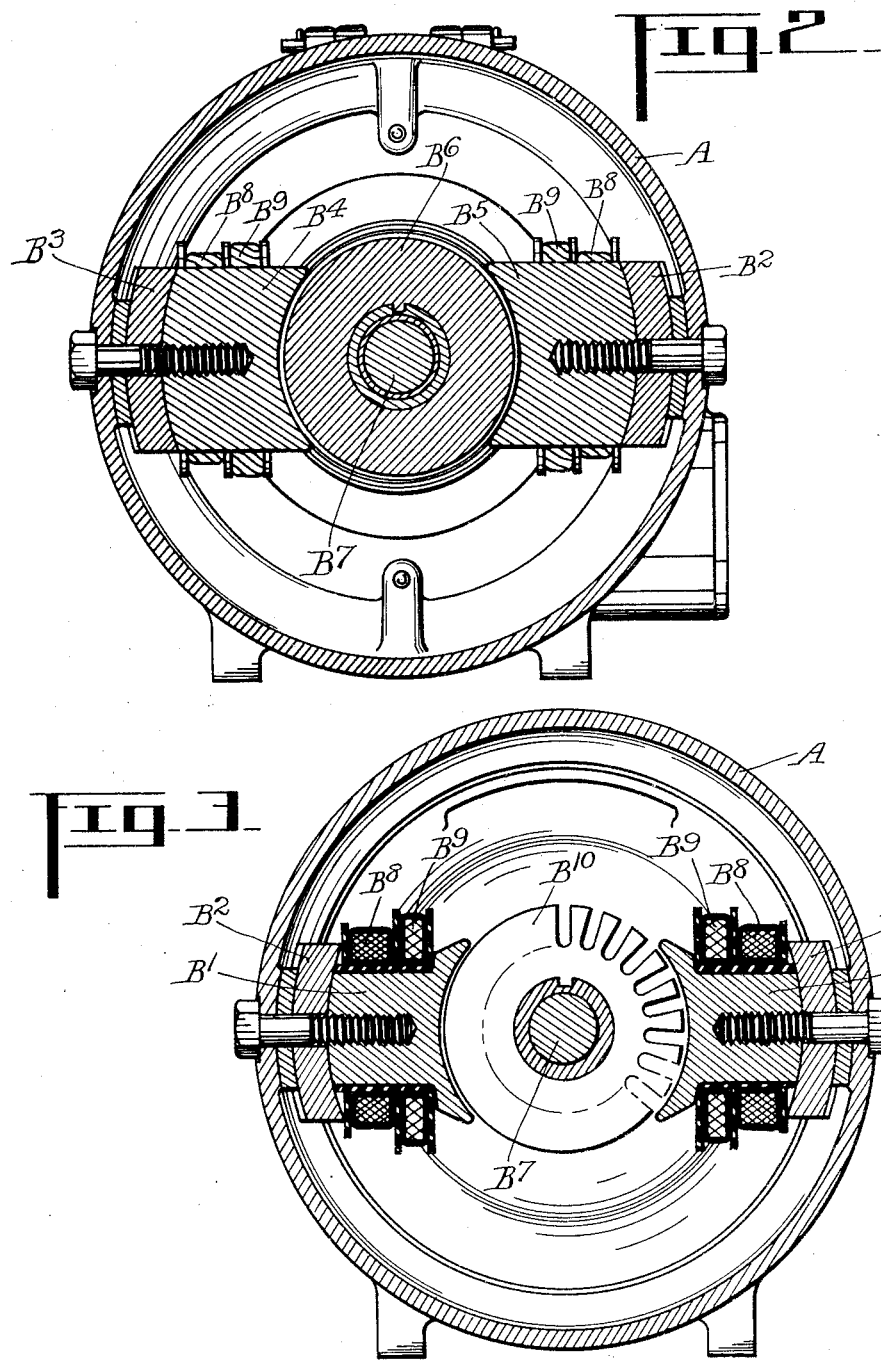
INVENTORS,
John J. Kennedy
Charles W. Dake
BY
ATTORNEYS.

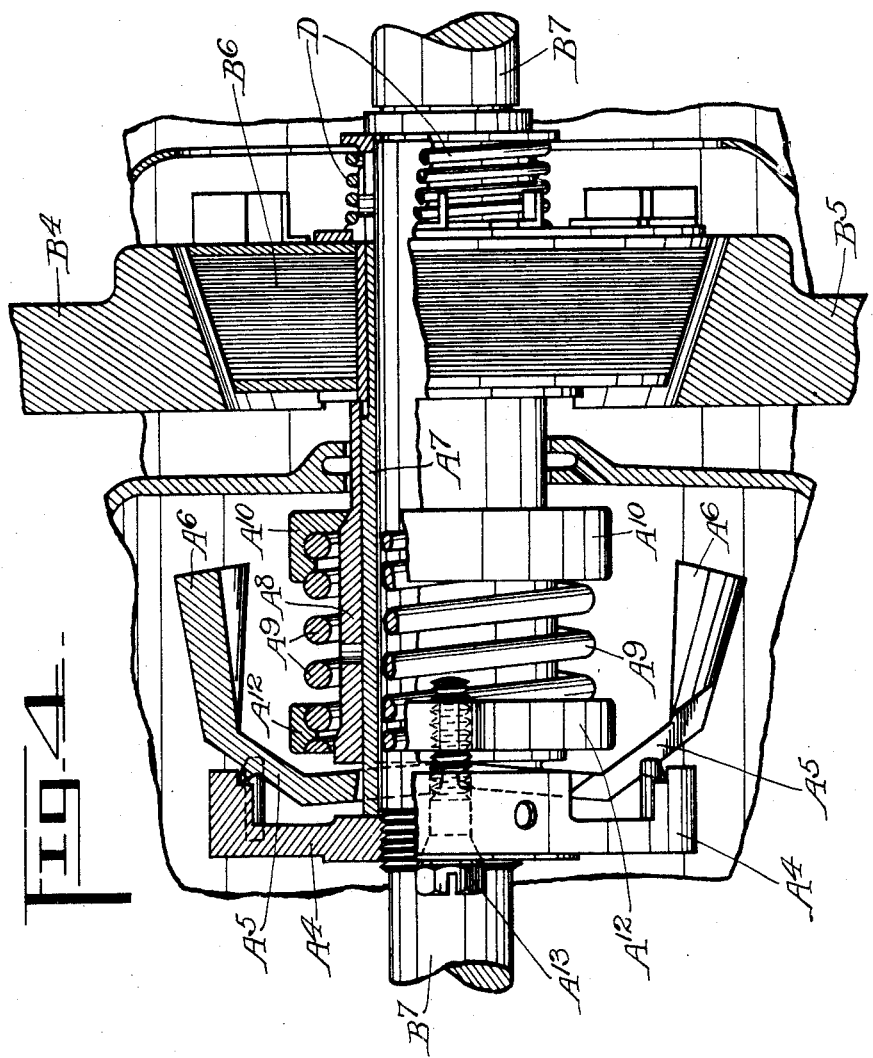

Patented July 7, 1931

1,813,496

UNITED STATES PATENT OFFICE

JOHN J. KENNEDY AND CHARLES W. DAKE, OF CHICAGO, ILLINOIS, ASSIGNORS TO THE PYLE-NATIONAL COMPANY, OF CHICAGO, ILLINOIS, A CORPORATION OF NEW JERSEY

FIELD CONTROL FOR ELECTRIC MACHINES

Application filed December 5, 1928. Serial No. 323,849.

Our invention relates to improvements in field control for electric machines and has for one object to provide in connection with an electric machine means for controlling the intensity of the field in consonance with change in speed and thereby to maintain constant voltage. This is accomplished by introducing in the magnetic circuit a variable gap independent of the gap in which the rotor operates which variable gap is increased as the speed goes up to decrease the intensity of the field and decreased as the speed goes down. Other objects will appear from time to time throughout the specification and claims.

Our invention is illustrated more or less diagrammatically in the accompanying drawings, wherein—

Figure 1 is a longitudinal section with parts in elevation;

Figure 2 is a section along the line 2—2 of Figure 1;

Figure 3 is a section along the line 3—3 of Figure 1;

Figure 4 is an enlarged section showing the parts in slightly different position.

Like parts are indicated by like characters throughout.

A is a frame closed at one end by a housing $A^1$ adapted to contain commutator brushes, bearing etc., at the other end by a governor housing $A^2$ which contains a bearing $A^3$, governor disc $A^4$, governor arms $A^5$ having weights $A^6$, a supporting sleeve $A^7$, a governing sleeve $A^8$ traveling thereon, a governing spring $A^9$ mounted at one end in the sliding ring $A^{10}$ and at the other end in the tension ring $A^{12}$ and connected by means of adjustable screws $A^{13}$ with the governing plate $A^4$ so that movement of the weights under centrifugal force tends to move the governing sleeve to the right.

A closed magnetic field is contained within the housing A formed by the two field poles B $B^1$, the longitudinal members $B^2$ $B^3$ and the gap poles $B^4$ $B^5$ and the adjustable gap plate $B^6$. $B^7$ is the rotor shaft carrying both the gap plate $B^6$ and the armature $B^{10}$. $B^8$ $B^9$ are field coils on the poles B $B^1$.

When the electric machine operates with the parts in the position shown in Figure 1, the field coils excite the field and there is a magnetic circuit broken by the air gaps between the poles B $B^1$, and the armature and the air gaps between the poles $B^4$ $B^5$ and the gap plate $B^6$. This gap is reduced to a minimum so that there is a maximum flow of magnetic flux through the magnetic circuit. As speed goes up the parts are brought in the position shown in Figure 4. The gap plate is moved to the right against the compression of the spring D by the governor so as to increase the air gap between the poles $B^4$ $B^5$ and the gap plate $B^6$. This introduces a resistance to the flow of magnetic flux and therefore decreases the intensity of the field of magnetic force cut by the armature or rotor and thereby adjustment of the response of the governor to speed, the relation between intensity of field and number of lines of force cut in at any time may be controlled to maintain the voltage constant.

We claim:

1. In an electric machine, a magnetic field circuit, including field poles, a rotor between said poles, air gap poles in series with the field poles and an adjustable closure for the air gap movable in consonance with the speed of rotation to vary the flow of magnetic lines of flux in the circuit, the air gap poles being in that part of the magnetic circuit furthest removed from the rotor.

2. In an electric machine, a magnetic field circuit, including field poles, a rotor between said poles, air gap poles in series with the field poles and an adjustable closure for the air gap movable in consonancce with the speed of rotation to vary the flow of magnetic lines of flux in the circuit, said means comprising a disc rotatable with the rotor, a governor and means responsive to the governor moving the disc longitudinally toward and from the air gap poles.

3. In an electric machine, a magnetic field circuit, including field poles, a rotor between said poles, air gap poles in series with the field poles and an adjustable closure for the air gap movable in consonance with the speed of rotation to vary the flow of magnetic lines of flux in the circuit, said means comprising a disc rotatable with the rotor, a governor and means responsive to the governor moving the disc longitudinally toward and from the air gap poles, the air gap poles and the effective face of the disc being inclined to the axis of rotation.

Signed at Chicago, county of Cook and State of Illinois, this 26th day of November, 1928.

JOHN J. KENNEDY.
CHARLES W. DAKE.